May 9, 1933. O. C. RITZ WOLLER 1,908,557
SPARE TIRE CARRIER
Filed Jan. 15, 1930
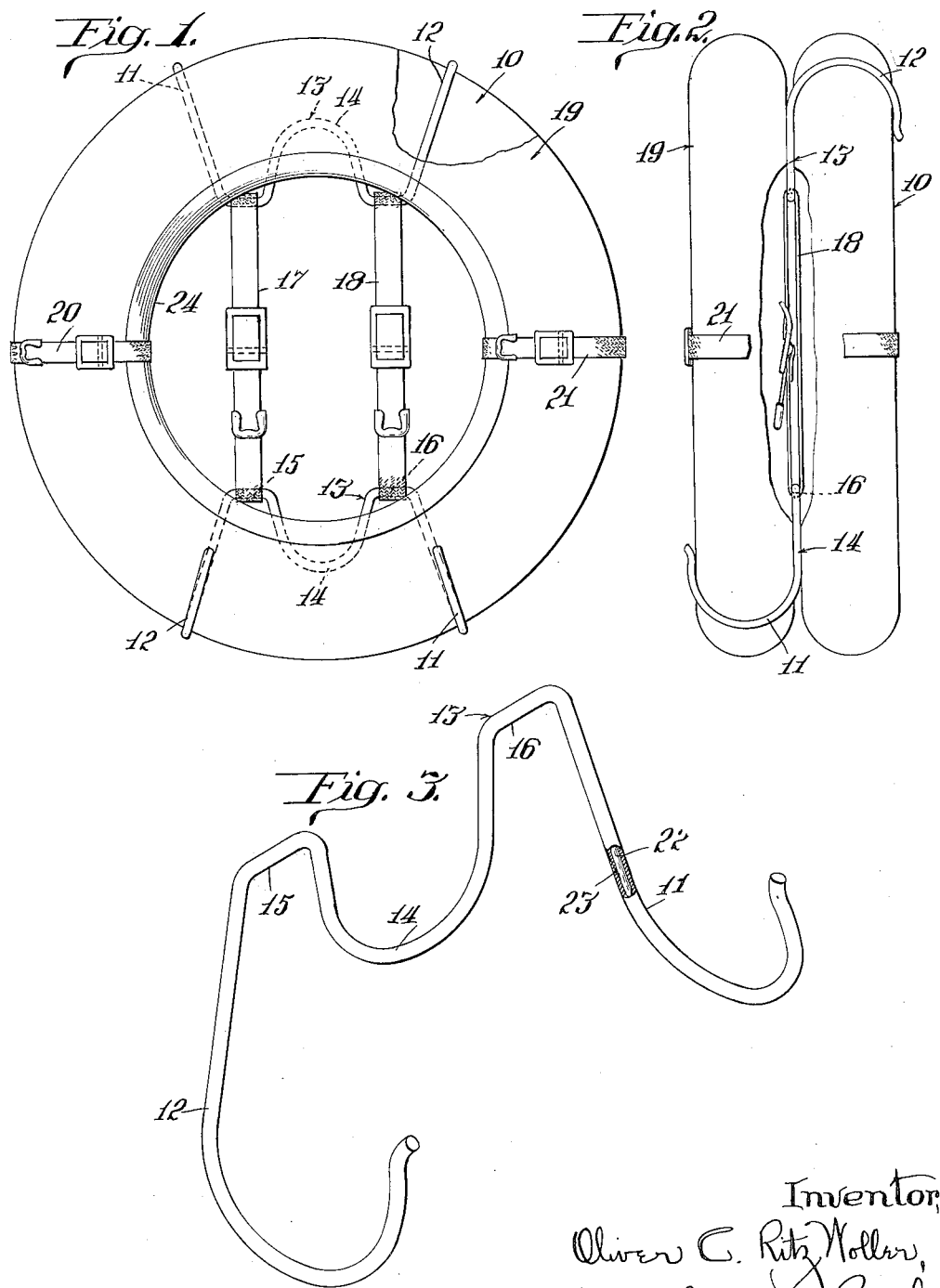

Patented May 9, 1933

1,908,557

UNITED STATES PATENT OFFICE

OLIVER C. RITZ WOLLER, OF CHICAGO, ILLINOIS

SPARE TIRE CARRIER

Application filed January 15, 1930. Serial No. 420,825.

My invention relates to spare tire carriers and particularly to the type of carrier which is adapted to be suspended from a spare tire already in position on a car for supporting a second spare tire therefrom. It is the object of my invention to provide a device of this type which can be very readily and quickly applied in position, which will require very little space for storage, and which can be produced and assembled ready for use at a modest cost.

It is one of the objects of my invention to provide a construction of this type which is readily adaptable to different sizes and types of tires and tire assemblies, whether with or without a spare rim or a spare wheel. It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a rear face view of my improved device as seen in operative position at the rear end of a car with a spare tire in position thereon;

Fig. 2 is a view of the parts shown in Fig. 1 as seen from the right in said Fig. 1; and Fig. 3 is an enlarged detail view of one of the saddle members of my improved device, partially broken away at one point for better showing the construction.

Referring to the several figures of the drawing, in which corresponding parts are indicated by the same reference characters, 10 indicates a spare tire supported in vertical position on the rear end of an automobile or elsewhere, the support for the tire being omitted for clearness of illustration. Upon the tire 10 there is mounted a saddle member comprising two hooks 11 and 12 connected together by a cross bar 13, the hooks and the cross bar being preferably formed integrally with each other from a light metal bar bent into shape. As is shown in Fig. 3, the hooks 11 and 12 are oppositely located with respect to each other, in the construction shown being mounted in diverging position. The cross bar 13 is bowed at its intermediate portion, as indicated at 14, such bowed portion extending in the same direction as the hooks 11 and 12. This bowed formation of the cross bar serves to provide seats 15 and 16 at the end portions of the cross bar for connecting straps as hereinafter described.

In use, two of the saddle members as above described are connected together in adjustable position with respect to each other, the connecting means in the construction shown being in the form of two straps 17 and 18 which extend about the cross bars of the hook members for supporting the lower saddle in inverted position with respect to the upper saddle, with the hooks 11 and 12 of the inverted saddle member at substantially even height.

With one of the saddle members in position upon a spare tire 10, with the hooks 11 and 12 engaging the tire 10 at opposite sides thereof, and with a second saddle supported in inverted position therefrom by means of straps 17 and 18, a second spare tire 19 is adapted very readily to be placed in position for support by the inverted saddle from said spare tire 10, the straps 17 and 18 being adjusted for holding the inverted saddle in such position as to support the tire 19 directly opposite the tire 10. With the tires in such position, straps 20 and 21 are preferably tightened about the two tires at opposite sides thereof for steadying the tire 19 in position. As is best shown in Fig. 3, each of the saddle members is preferably made up from a light metal bar 22 provided with a covering 23 of rubber or other suitable material by virtue of which the saddles will have very little if any chafing effect upon the tires 10 and 19.

In the use of my improved device, a motorist is enabled very quickly and easily to apply a second spare tire securely in position from the spare tire ordinarily carried, such second spare tire comprising merely a casing or comprising if desired a casing and a tube in position upon a rim and ready for use. In the construction shown, the tire 19 is mounted upon a rim 24 in accordance with approved practice. As will be readily understood, the tire 10 is ordinarily mounted upon a rim or upon a spare wheel ready for use. The drawing does not show the particular form of tire assembly, it being understood that the arrangement may be of any approved form. It will be appreciated that a tire 19 can readily be supported in position as shown even though the tire 10 were mounted upon a wire spoke wheel of the ordinary form in which the hub portion extends axially some little distance beyond the face of the tire, the tire 19 being adapted to have the desired position for support without interference from such projecting hub portion.

By the use of the straps 17 and 18, or similarly adjustable means, the oppositely disposed saddles can be supported in the desired adjusted position for holding the two tires in oppositely disposed position with respect to each other regardless of the shape or size of the tires. The hooks 11 and 12 can readily be shaped to correspond to the size of the tire with which the device is to be used.

While I prefer to employ the construction substantially as shown in my drawing, it is to be understood that I do not limit my invention thereto, except so far as the claims may be limited by the prior art.

I claim:—

1. In a spare tire carrier, the combination of two members each made from a piece of light rubber-covered metal bar bent into shape and each comprising a cross bar and two hooks at opposite ends of said cross bar portion, and flexible adjustable means connecting said two members together with one of the members in inverted position with respect to the other.

2. In a spare tire carrier, the combination of two members each made from a piece of light metal bar bent into shape and each comprising a cross bar and two hooks at opposite ends of said cross bar member, and strap means connecting said two cross bars for supporting one of said members from the other in inverted position with respect thereto, each of said cross bars being offset at its intermediate portion serving to provide seats for said straps.

3. In a spare tire carrier, the combination of two members each made from a piece of light metal bar bent into shape and each comprising a cross bar and two hooks at opposite ends of said cross bar portion, said cross bar portion being bowed outwardly at its intermediate portion in the same direction as that in which the hooks extend therefrom, and connections between said two cross bars for supporting one of said members from the other in inverted position with respect thereto.

4. In a spare tire carrier, the combination of two members each made from a piece of light metal bar bent at an angle at spaced points for providing two arms in the same plane at opposite ends of the bar, the arms of each of said members being doubled backwardly upon themselves in the same direction from said plane for providing open hooks, and means connecting said two members at their end portions for supporting one member from the other in inverted position with respect thereto.

OLIVER C. RITZ WOLLER.